US011996069B2

(12) United States Patent
Jordan

(10) Patent No.: US 11,996,069 B2
(45) Date of Patent: May 28, 2024

(54) VENT NIBS FOR WOODWIND INSTRUMENTS

(71) Applicant: Robert Jordan, O'Fallon, IL (US)

(72) Inventor: Robert Jordan, O'Fallon, IL (US)

( * ) Notice: Subject to any disclaimer, the term of this patent is extended or adjusted under 35 U.S.C. 154(b) by 0 days.

(21) Appl. No.: 18/337,352

(22) Filed: Jun. 19, 2023

(65) Prior Publication Data

US 2023/0335085 A1 Oct. 19, 2023

Related U.S. Application Data

(63) Continuation of application No. 17/750,150, filed on May 20, 2022, now Pat. No. 11,735,148.

(60) Provisional application No. 63/191,326, filed on May 20, 2021.

(51) Int. Cl.
*G10D 9/047* (2020.01)
*G10D 7/063* (2020.01)

(52) U.S. Cl.
CPC ............. *G10D 9/047* (2020.02); *G10D 7/063* (2013.01)

(58) Field of Classification Search
CPC ............................... G10D 9/047; G10D 7/063
See application file for complete search history.

(56) References Cited

U.S. PATENT DOCUMENTS

| | | | | |
|---|---|---|---|---|
| 1,549,911 A * | 8/1925 | Dreves | G10D 9/047 | 984/145 |
| 2,020,261 A * | 11/1935 | Loney | G10D 9/047 | 984/145 |
| 2,226,536 A * | 12/1940 | Seimer | G10D 9/047 | 137/802 |
| 2,232,929 A * | 2/1941 | Selmer | G10D 7/08 | 984/134 |
| 2,508,550 A * | 5/1950 | Stubbins | G10D 9/047 | 984/145 |
| 2,832,250 A * | 4/1958 | Leblanc | G10D 7/066 | 84/382 |
| 3,205,752 A * | 9/1965 | Carruthers | G10D 9/047 | 984/145 |
| 7,468,479 B2 * | 12/2008 | Kraus | G10D 9/047 | 84/385 P |
| 8,314,318 B2 * | 11/2012 | Brockman | G10D 9/047 | 84/386 |
| 11,735,148 B2 * | 8/2023 | Jordan | G10D 7/063 | 84/386 |
| 2022/0375438 A1 * | 11/2022 | Jordan | G10D 9/047 | |
| 2023/0335085 A1 * | 10/2023 | Jordan | G10D 9/047 | |

* cited by examiner

*Primary Examiner* — Robert W Horn
(74) *Attorney, Agent, or Firm* — Incubate IP; Randy R. Micheletti

(57) ABSTRACT

The present disclosure provides vent nibs for use with (e.g., incorporation into) a woodwind instrument, such as a bassoon.

11 Claims, 7 Drawing Sheets

FIG. 1
(PRIOR ART)
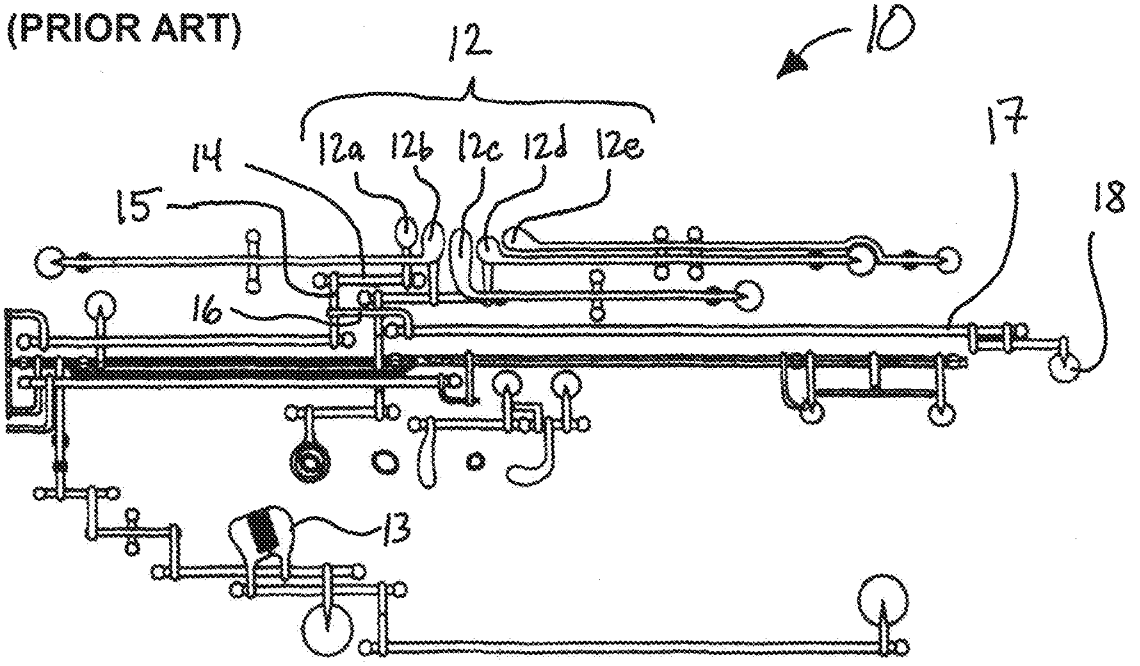
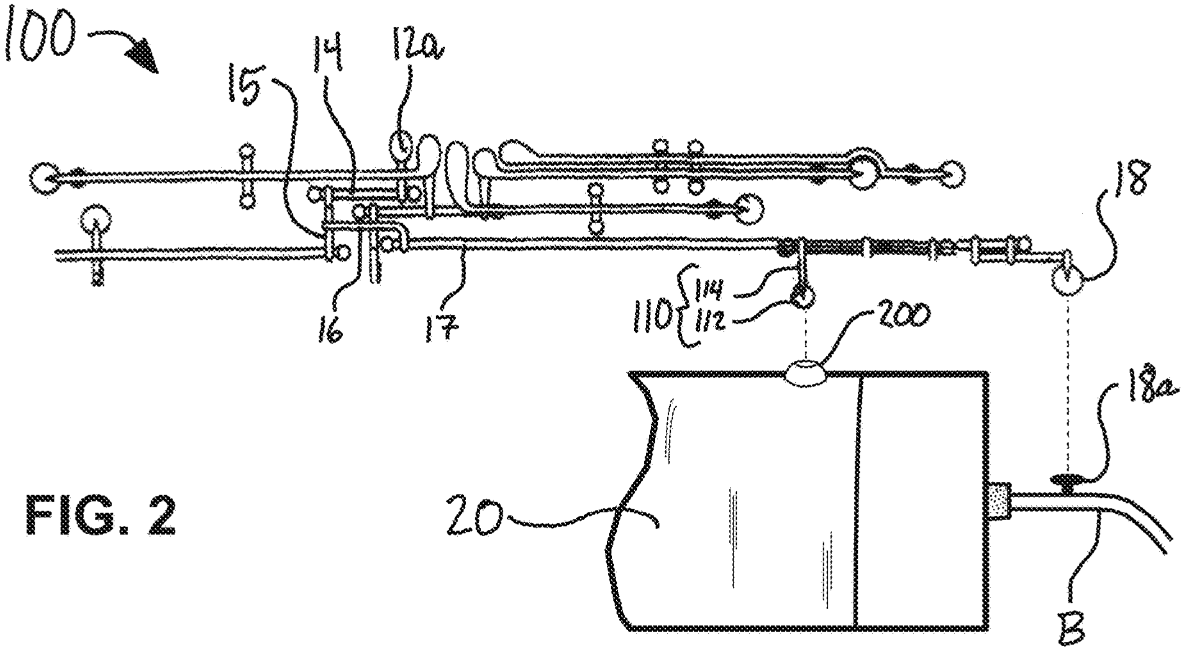
FIG. 2

FIG. 3
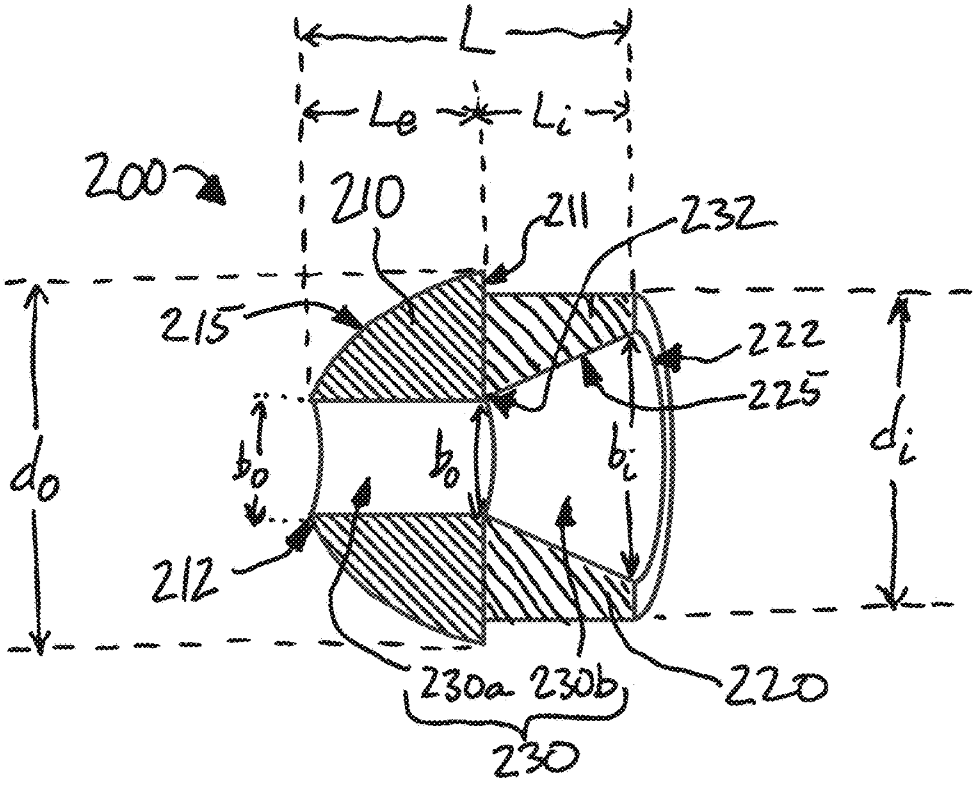
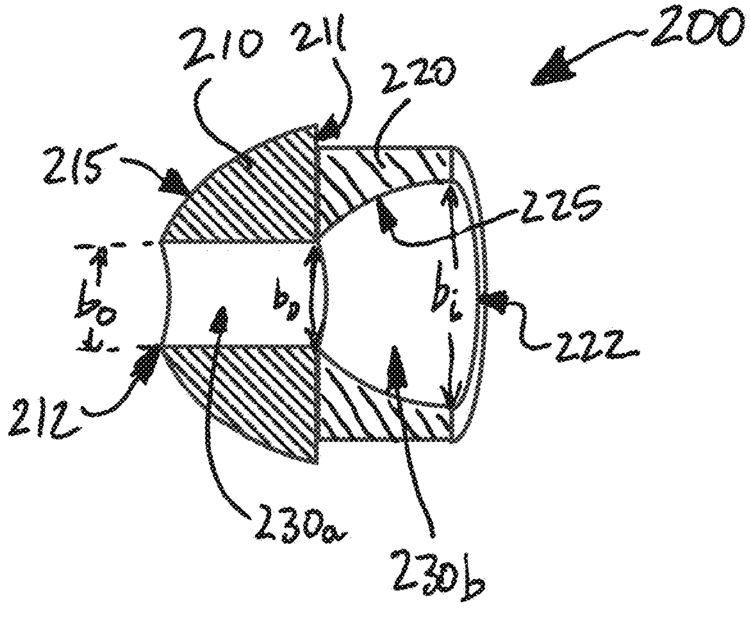
FIG. 4

(NOT TO SCALE)

FIG. 9
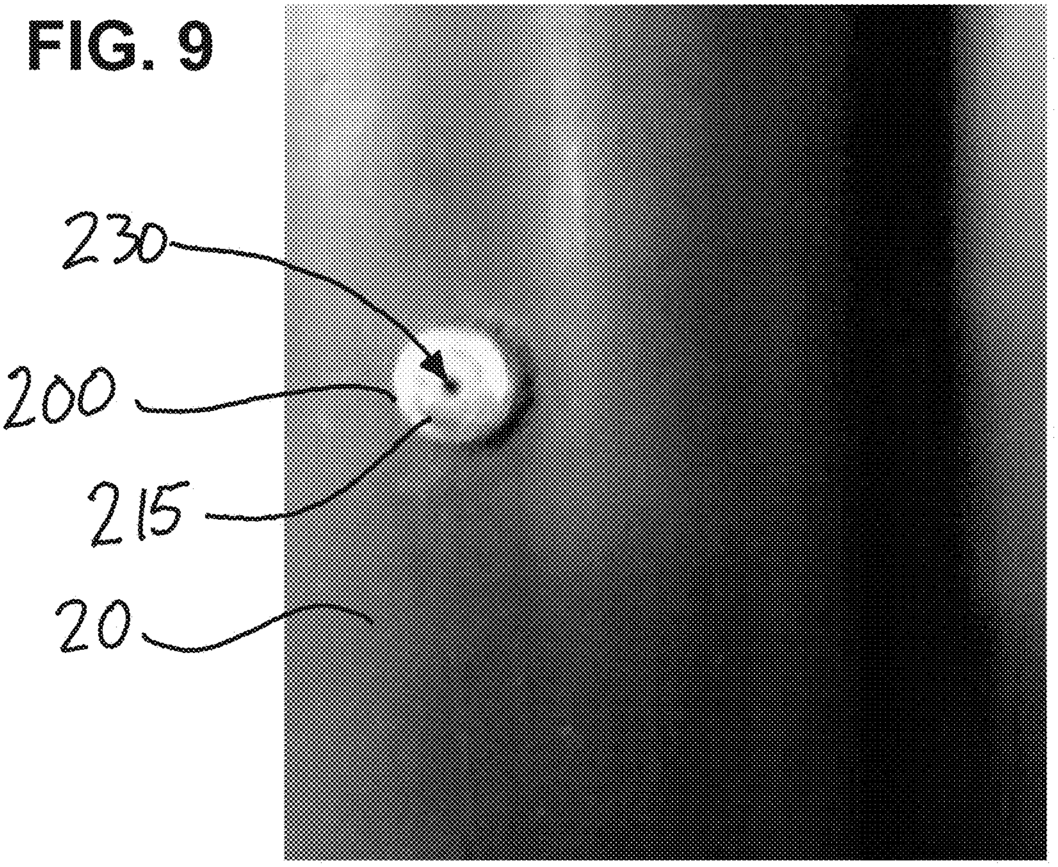
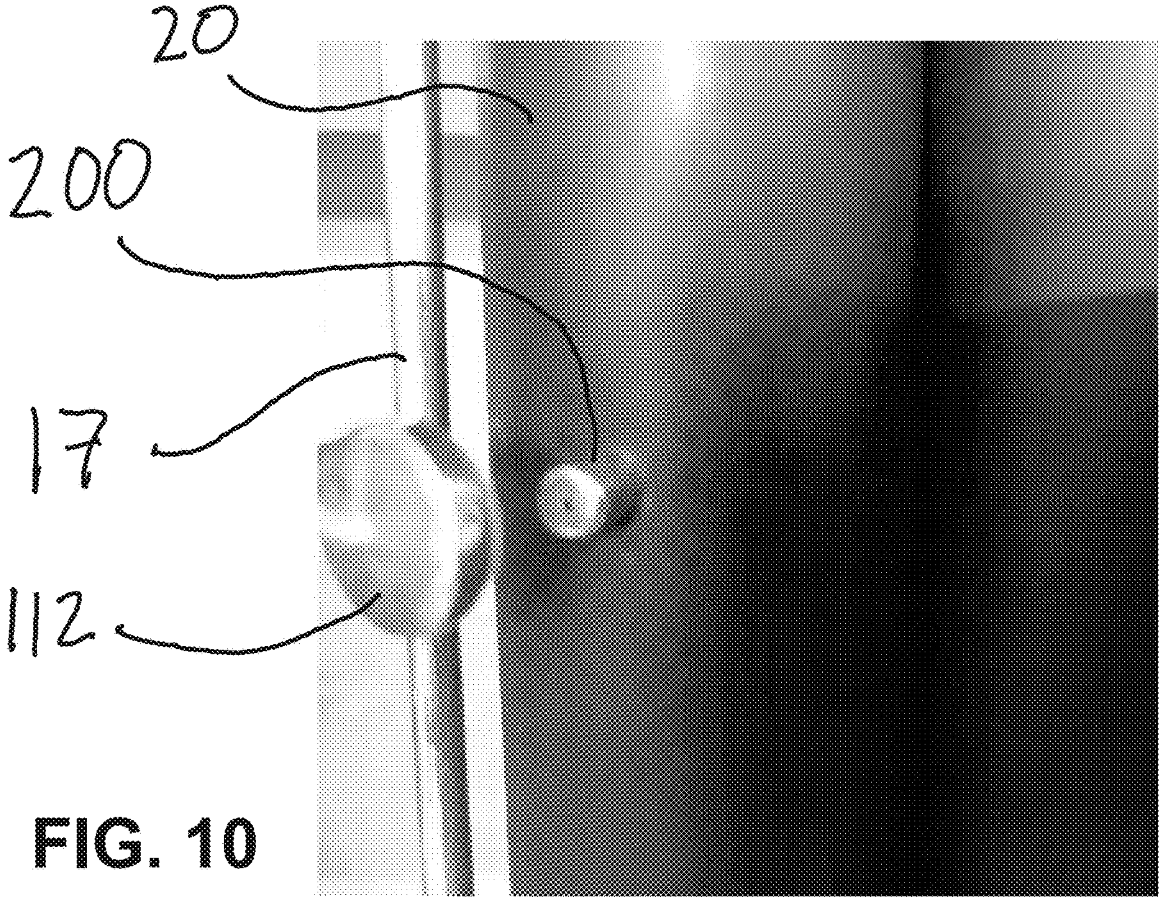
FIG. 10

FIG. 11
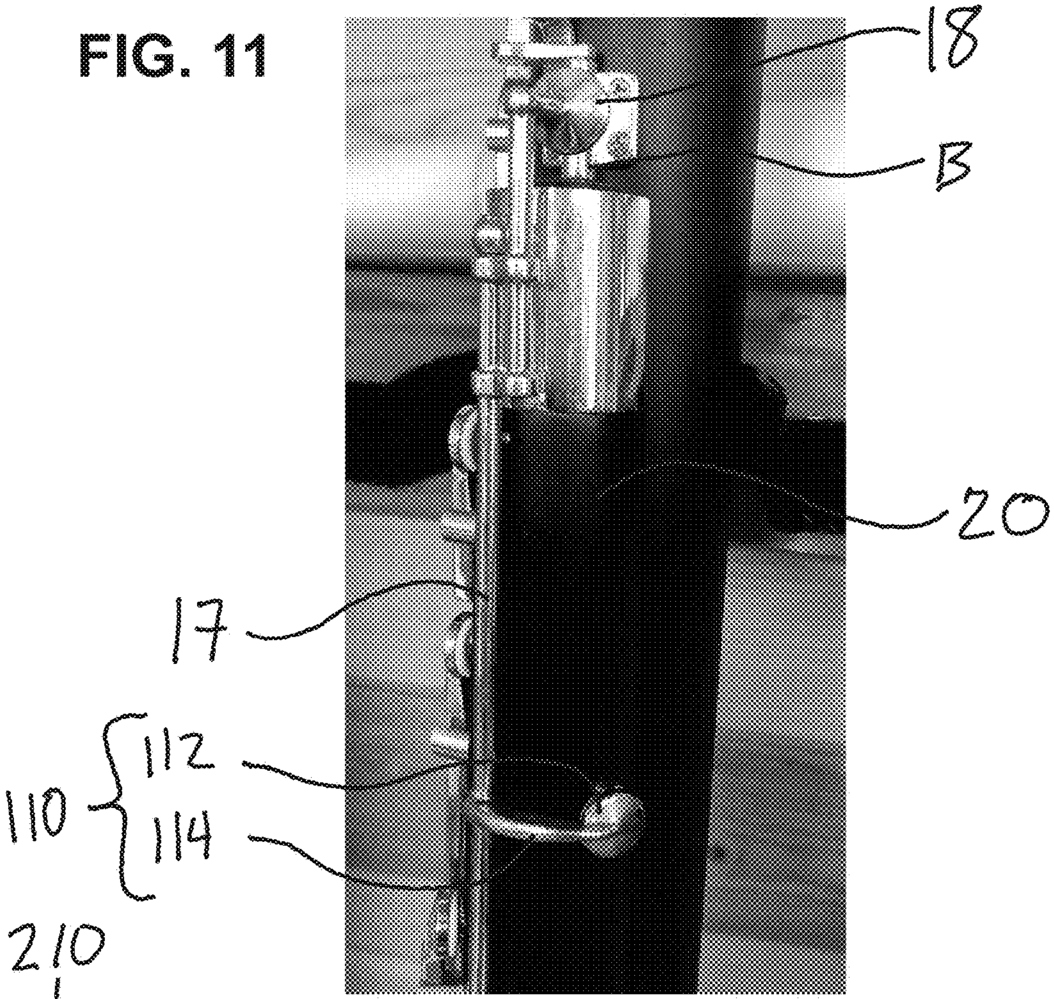
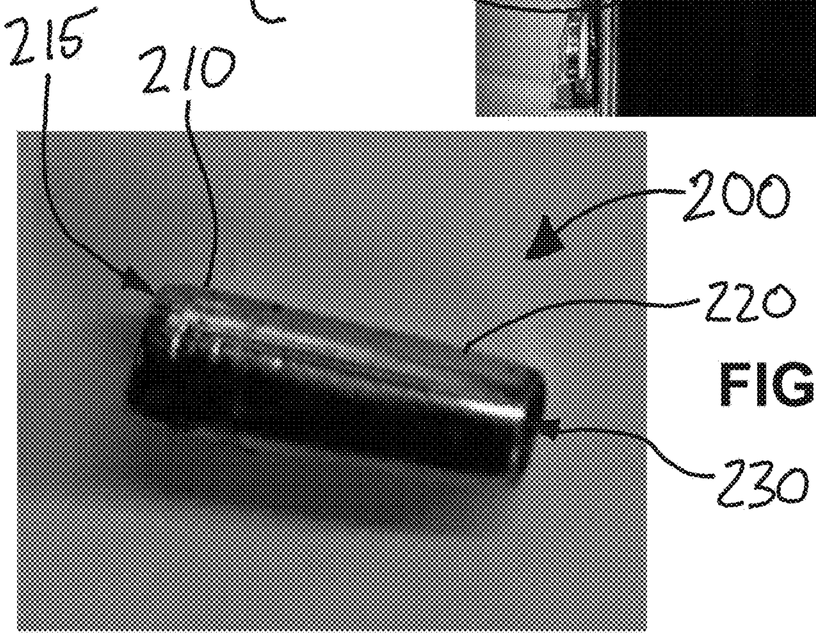
FIG. 12

VENT NIBS FOR WOODWIND INSTRUMENTS

PRIORITY CLAIM

This application is a continuation application of U.S. patent application Ser. No. 17/750,150, filed on May 20, 2022, and issued on Aug. 22, 2023, as U.S. Pat. No. 11,735,148, and which claims priority to U.S. Provisional Patent Application Ser. No. 63/191,326, filed on May 20, 2021, the entire contents of each of which are incorporated herein by reference and relied upon.

FIELD

The present disclosure provides improved octave key systems for use with (e.g., incorporation into) an instrument in the bassoon family.

BACKGROUND

Instruments in the bassoon family are capable of emitting pitches across a wide musical range. However, that flexibility also lends the instrument to intonation issues—one tube of fixed length cannot possibly accommodate stable standing waves of precise and consistent pitch without complicated means for precisely adjusting those standing waves.

In the 20th century, the Weisberg System (FIG. 1) was developed to address certain intonation issues for bassoon instruments. While this system dramatically improves intonation of many commonly required musical pitches, the Weisberg System is complicated and requires a large number of intricate and precisely installed keys, rods, bridges, and pads accompanying holes.

A need persists for improved octave key systems for instruments in the bassoon family.

The present disclosure satisfies this need.

SUMMARY

In one embodiment, the present disclosure provides an improved octave system for a bassoon instrument, the improved octave system comprising: a vent nib 200 disposed through a side wall 20*w* of a wing joint component 20 of the musical instrument; and a thumb-actuated octave key 100 comprising: a thumb key 12*a*, and a whisper key pad 18 and a sealing pad 112 each operatively connected to the thumb pad 12*a* by one or more rods and bridges 14-17, wherein the whisper key pad 18 is disposed to seal a bocal nub hole 18*a* disposed on a bocal B when the thumb key 12*a* is actuated, and wherein the sealing pad 112 is disposed to seal the vent nib 200 when the thumb key 12*a* is actuated.

BRIEF DESCRIPTION OF THE FIGURES

FIG. 1 shows a schematic view of a prior art octave key system for bassoon instruments commonly known as the Weisberg System.

FIG. 2 shows a schematic view of an improved octave key system for bassoon instruments consistent with one embodiment of the present disclosure.

FIG. 3 shows a cross-sectional view of a vent nib of an improved octave key system consistent with one embodiment of the present disclosure.

FIG. 4 shows a cross-sectional view of a vent nib of an improved octave key system consistent with another embodiment of the present disclosure.

FIG. 9 is a photograph of a vent nib of an improved octave key system consistent with one embodiment of the present disclosure installed in the side wall of a wing joint component of a bassoon.

FIG. 10 is a photograph of the vent nib of FIG. 9 and associated sealing pad of an improved octave key system consistent with one embodiment of the present disclosure installed in the side wall of a wing joint component of a bassoon.

FIG. 11 is a photograph of the vent nib of FIG. 9 and associated sealing pad, rods and bridges, and whisper key of an improved octave key system consistent with one embodiment of the present disclosure installed on a bassoon.

FIG. 12 is a photograph of the vent nib of FIG. 9 before installment in the wing joint component of a bassoon.

DETAILED DESCRIPTION

Figure 5:
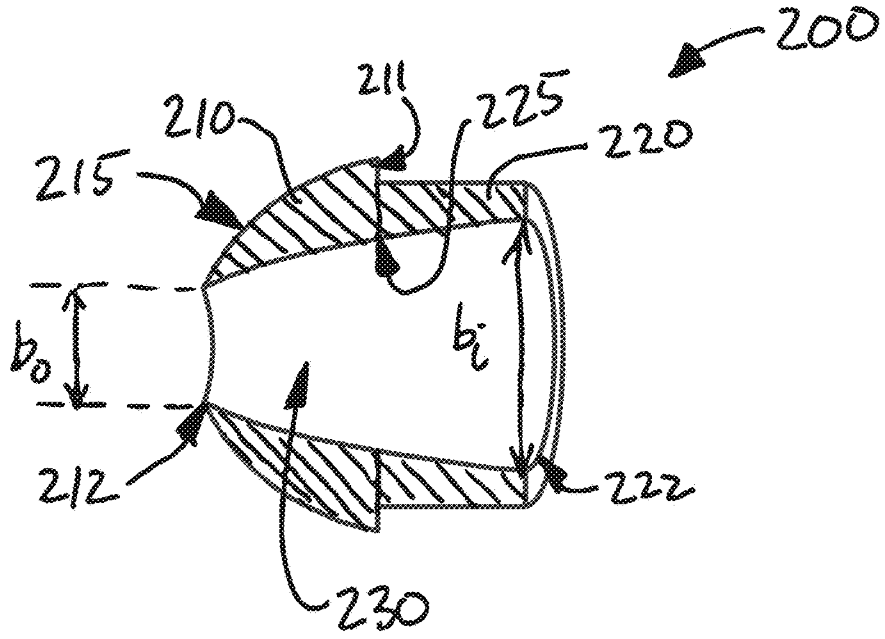
FIG. 5 shows a cross-sectional view of a vent nib of an improved octave key system consistent with another embodiment of the present disclosure.
Figure 6:
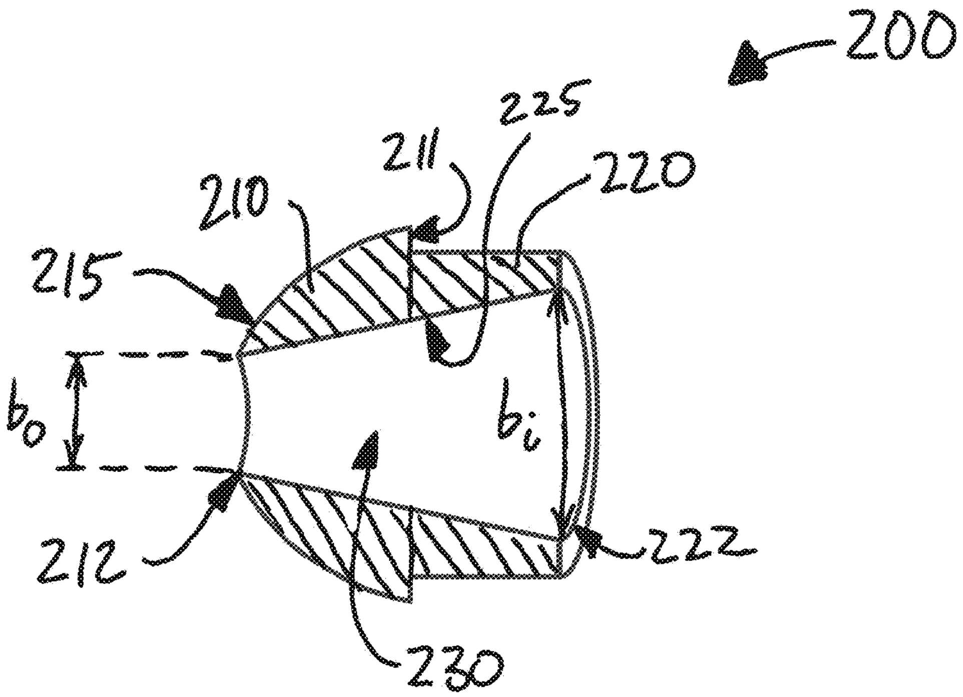
FIG. 6 shows a cross-sectional view of a vent nib of an improved octave key system consistent with another embodiment of the present disclosure.
Figure 7:
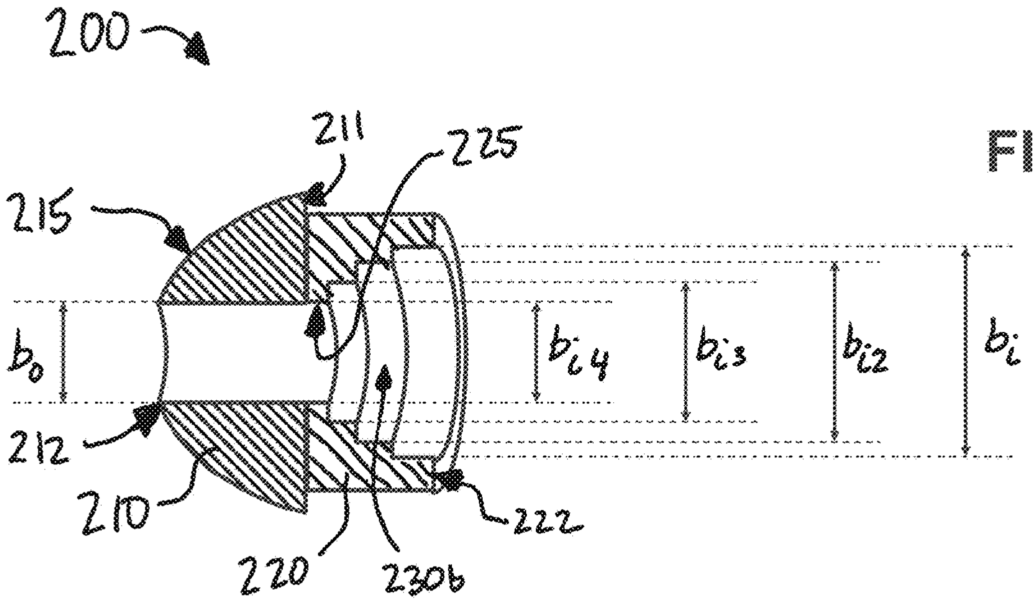
FIG. 7 shows a cross-sectional view of a vent nib of an improved octave key system consistent with another embodiment of the present disclosure.
Figure 8:
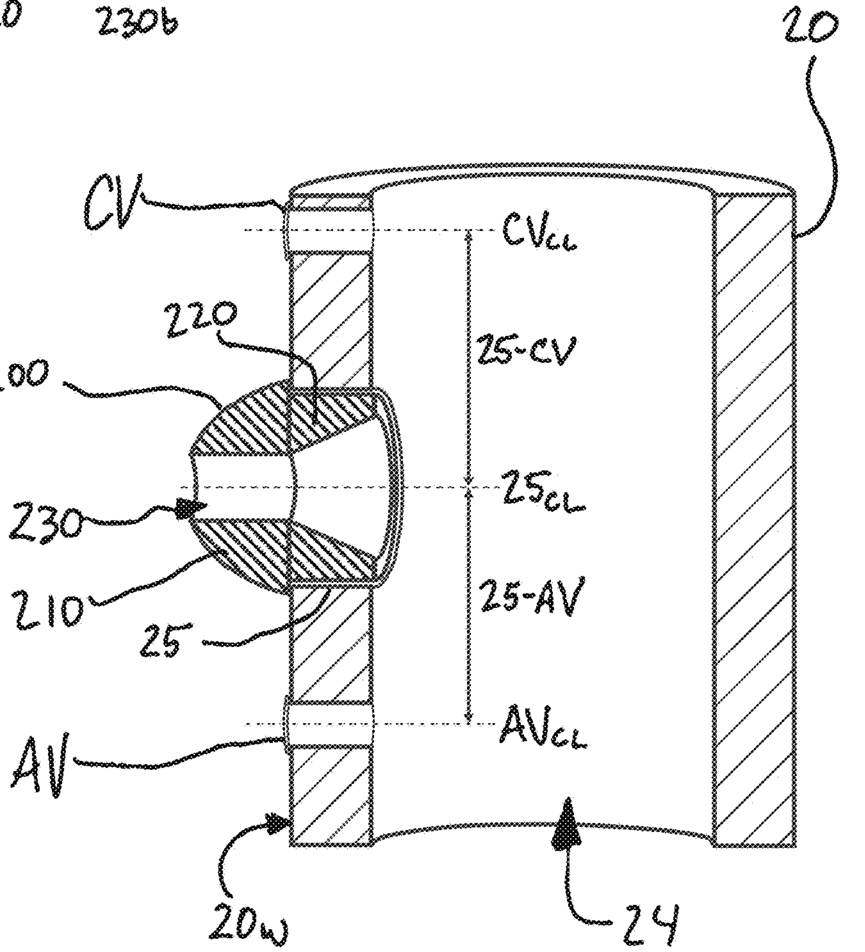
FIG. 8 shows a representative schematic view of the vent nib of FIG. 3 installed in a wing joint of a bassoon.

Prior art octave systems 10, such as the Weisberg System shown specifically in FIG. 1, require a complex network of thumb keys 12 and locks 13 configured to control various pads. The multitude of controls are designed to improve intonation of the instrument's pitch within various subranges of the typical playing ranges of Bb1 to F5 (for a standard bassoon) or Bb0 or A0 to D4 (for a contrabassoon).

Referring generally to FIGS. 2-12, the present disclosure provides improved octave key systems for use with (e.g., incorporation into) a musical instrument in the bassoon family, such as a bassoon or a contrabassoon. Octave key systems consistent with the present disclosure feature a dramatically reduced number of controls compared to prior art octave key systems.

In general, octave systems 100 for a bassoon instrument consistent with the present disclosure include a vent nib 200 disposed on a wing joint 20 of the instrument in operable communication with a thumb key 12*a* via a sealing pad 112. In operation, actuation of the thumb key 12*a* causes the sealing pad 112 to seal (e.g., partially seal or completely seal) the vent nib 200 to change a standing wave resonating within a bore 24 of the wing joint 20.

Generally, the octave key system 100 is configured such that the vent nib 200 is unsealed (e.g., is in an open configuration) until the thumb key 12*a* is activated. In some embodiments, the octave key system 100 is configured such that the vent nib 200 and the bocal nub vent 18*a* are both unsealed (e.g., are both in open configurations) until the thumb key 12*a* is activated. In these embodiments, the vent nib 200 and/or the bocal nub vent 18*a* remain in a closed configuration (e.g., remain sealed) as long as the thumb key 12*a* is held in an activated position (e.g., is pressed towards the surface of the wing joint 20), and transitions to an open configuration when the thumb key 12*a* is released.

In some embodiments, the sealing pad 112 includes a natural or synthetic resilient pad, such as white leather, that engages the outer surface 215 of the vent nib 200 when the thumb key 12*a* is activated.

The sealing pad 112 is in operable communication with the thumb key 12*a* by one or more rods and bridges 14-17. The exact number and configuration of the rods and bridges 14-17 may vary depending on the other features present on the particular bassoon instrument of interest. In the example specifically shown in FIG. 2, the sealing pad 112 is disposed on the same rod 17 as the whisper key pad 18; two bridges 15-16 connect the rod 17 to an intermediate rod 14 upon which the thumb key 12*a* is disposed. Actuation of the thumb key 12*a* causes the rod 17 to rotate sufficiently for the sealing pad 112 to contact the outer surface 215 of the vent nib 200 and for the whisper key 18 to contact the outer surface of the bocal nub vent 18*a*.

Referring now to FIGS. 3-7 and 12, the vent nib 200 may adopt one of several configurations. Generally, the vent nib 200 includes an external component 210 having a curved outer surface 215 configured to temporarily mate with the sealing pad 112 to seal the bore 230 of the vent nib 200. The vent nib 200 also includes an internal component 220 configured to mate permanently with a bore 25 disposed through the side wall 20*w* of the wing joint 20 of the bassoon. In some embodiments, the minor diameter $d_i$ of the internal component 220 is slightly smaller than the major diameter d o of the external component 210 such that a shoulder 211 is formed between the external component 210 and the internal component 220. The shoulder 211 may improve purchase of the vent nib 200 within the wing joint side wall 20*w*, for example to prevent installation of the vent nib 200 too deeply or too shallowly within the side wall 20*w*.

In some embodiments, the major diameter d o of the external component 210 is about 3.0 mm to about 4.0 mm, for example 3.0 mm, 3.1 mm, 3.2 mm, 3.3 mm, 3.4 mm, 3.5 mm, 3.6 mm, 3.7 mm, 3.8 mm, 3.9 mm, or 4.0 mm.

In some embodiments, the minor diameter $d_i$ of the internal component 220 is about 2.8 mm to about 3.8 mm, for example 2.8 mm, 2.9 mm, 3.0 mm, 3.1 mm, 3.2 mm, 3.3 mm, 3.4 mm, 3.5 mm, 3.6 mm, 3.7 mm, or 3.8 mm.

In some embodiments, the minor diameter $d_i$ of the internal component 220 is about 0.15 mm to about 0.25 mm smaller than the major diameter d o of the external component 210. For example and without limitation, the minor diameter $d_i$ of the internal component 220 may be 0.15 mm, 0.16 mm, 0.17 mm, 0.18 mm, 0.19 mm, 0.20 mm, 0.21 mm, 0.22 mm, 0.23 mm, 0.24 mm, or 0.25 mm smaller than the major diameter d o of the external component 210.

The bore 230 extends the entire length L of the vent nib 200 such that, after installation in a side wall 20*w* of a wing joint 20, the inner bore 24 of the wing joint 20 is in fluid communication with the external atmosphere around the wing joint 20 via the bore 230. The bore 230 in some embodiments includes a first cylindrical bore portion 230*a* having a bore size $b_o$ at the outermost tip 212 of the vent nib 200. The bore size $b_o$ of the cylindrical bore portion 230*a* is generally about 0.6 mm to about 0.9 mm, for example 0.60 mm, 0.61 mm, 0.62 mm, 0.63 mm, 0.64 mm, 0.65 mm, 0.66 mm, 0.67 mm, 0.68 mm, 0.69 mm, 0.70 mm, 0.71 mm, 0.72 mm, 0.73 mm, 0.74 mm, 0.75 mm, 0.76 mm, 0.77 mm, 0.78 mm, 0.79 mm, 0.80 mm, 0.81 mm, 0.82 mm, 0.83 mm, 0.84 mm, 0.85 mm, 0.86 mm, 0.87 mm, 0.88 mm, 0.89 mm, or 0.90 mm.

In some embodiments, the cylindrical bore portion 230*a* extends the entire length L of the vent nib 200, such that the bore size $b_o$ at the outermost tip 212 and the bore size $b_o$ at the innermost point 222 is the same.

In other embodiments, the cylindrical bore portion 230*a* extends only a portion of the overall length L of the vent nib 200, with the bore 230 further comprising a second bore portion 230*b* extending from the inner edge of the cylindrical bore portion 230*a* to the innermost edge 222 of the vent nib 200. In such embodiments, the cylindrical bore 230*a* may extend into the bore 230 from the outermost tip 212 a length $L_e$ of about 1 mm to about 3 mm from the outermost tip 212, such as 1.0 mm, 1.1 mm, 1.2 mm, 1.3 mm, 1.4 mm, 1.5 mm, 1.6 mm, 1.7 mm, 1.8 mm, 1.9 mm, 2.0 mm, 2.1 mm, 2.2 mm, 2.3 mm, 2.4 mm, 2.5 mm, 2.6 mm, 2.7 mm, 2.8 mm, 2.9 mm, or 3.0 mm.

The second bore portion 230*b* includes at least one second bore size $b_i$, and may be cylindrical, tapered, curved (e.g., parabolic), arcuate, or stepped. In some embodiments the second bore portion 230*b* extends the entire length L of the bore 230. In other embodiments, the second bore portion 230*b* extends a length Li from the innermost end 222 only a portion of the overall length L of the bore 230. In such embodiments, the second bore portion 230*b* may extend a length Li from the innermost end 222 of about 5.5 mm to about 9 mm, for example 5.5 mm, 5.6 mm, 5.7 mm, 5.8 mm, 5.9 mm, 6 mm, 6.1 mm, 6.2 mm, 6.3 mm, 6.4 mm, 6.5 mm, 6.6 mm, 6.7 mm, 6.8 mm, 6.9 mm, 7 mm, 7.1 mm, 7.2 mm, 7.3 mm, 7.4 mm, 7.5 mm, 7.6 mm, 7.7 mm, 7.8 mm, 7.9 mm, 8 mm, 8.1 mm, 8.2 mm, 8.3 mm, 8.4 mm, 8.5 mm, 8.6 mm, 8.7 mm, 8.8 mm, 8.9 mm, or 9.0 mm.

The second bore portion 230*b* includes a bore size $b_i$ at the innermost end 222 that is the same as or larger than the bore size $b_o$ at the outermost tip 212. Generally, the bore size $b_i$ can be about 0.6 mm to about 2.5 mm, for example 0.60 mm, 0.61 mm, 0.62 mm, 0.63 mm, 0.64 mm, 0.65 mm, 0.66 mm, 0.67 mm, 0.68 mm, 0.69 mm, 0.70 mm, 0.71 mm, 0.72 mm, 0.73 mm, 0.74 mm, 0.75 mm, 0.76 mm, 0.77 mm, 0.78 mm, 0.79 mm, 0.80 mm, 0.81 mm, 0.82 mm, 0.83 mm, 0.84 mm, 0.85 mm, 0.86 mm, 0.87 mm, 0.88 mm, 0.89 mm, 0.90 mm, 0.91 mm, 0.92 mm, 0.93 mm, 0.94 mm, 0.95 mm, 0.96 mm, 0.97 mm, 0.98 mm, 0.99 mm, 1.00 mm, 1.01 mm, 1.02 mm, 1.03 mm, 1.04 mm, 1.05 mm, 1.06 mm, 1.07 mm, 1.08 mm, 1.09 mm, 1.10 mm, 1.11 mm, 1.12 mm, 1.13 mm, 1.14 mm, 1.15 mm, 1.16 mm, 1.17 mm, 1.18 mm, 1.19 mm, 1.20 mm, 1.21 mm, 1.22 mm, 1.23 mm, 1.24 mm, 1.25 mm, 1.26 mm, 1.27 mm, 1.28 mm, 1.29 mm, 1.30 mm, 1.31 mm, 1.32 mm, 1.33 mm, 1.34 mm, 1.35 mm, 1.36 mm, 1.37 mm, 1.38 mm, 1.39 mm, 1.40 mm, 1.41 mm, 1.42 mm, 1.43 mm, 1.44 mm, 1.45 mm, 1.46 mm, 1.47 mm, 1.48 mm, 1.49 mm, 1.50 mm, 1.51 mm, 1.52 mm, 1.53 mm, 1.54 mm, 1.55 mm, 1.56 mm, 1.57 mm, 1.58 mm, 1.59 mm, 1.60 mm, 1.61 mm, 1.62 mm, 1.63 mm, 1.64 mm, 1.65 mm, 1.66 mm, 1.67 mm, 1.68 mm, 1.69 mm, 1.70 mm, 1.71 mm, 1.72 mm, 1.73 mm, 1.74 mm, 1.75 mm, 1.76 mm, 1.77 mm, 1.78 mm, 1.79 mm, 1.80 mm, 1.81 mm, 1.82 mm, 1.83 mm, 1.84 mm, 1.85 mm, 1.86 mm, 1.87 mm, 1.88 mm, 1.89 mm, 1.90 mm, 1.91 mm, 1.92 mm, 1.93 mm, 1.94 mm, 1.95 mm, 1.96 mm, 1.97 mm, 1.98 mm, 1.99 mm, 2.00 mm, 2.01 mm, 2.02 mm, 2.03 mm, 2.04 mm, 2.05 mm, 2.06 mm, 2.07 mm, 2.08 mm, 2.09 mm, 2.10 mm, 2.11 mm, 2.12 mm, 2.13 mm, 2.14 mm, 2.15 mm, 2.16 mm, 2.17 mm, 2.18 mm, 2.19 mm, 2.20 mm, 2.21 mm, 2.22 mm, 2.23 mm, 2.24 mm, 2.25 mm, 2.26 mm, 2.27 mm, 2.28 mm, 2.29 mm, 2.30 mm, 2.31 mm, 2.32 mm, 2.33 mm, 2.34 mm, 2.35 mm, 2.36 mm, 2.37 mm, 2.38 mm, 2.39 mm, 2.40 mm, 2.41 mm, 2.42 mm, 2.43 mm, 2.44 mm, 2.45 mm, 2.46 mm, 2.47 mm, 2.48 mm, 2.49 mm, or 2.50 mm. In one specific example, the bore size $b_i$ is about 2.0-2.1 mm, or about 2.08 mm.

In some embodiments, such as those consistent with the example specifically illustrated in FIGS. 4-5, the bore 230 is curved along all or substantially all of the length L from the outermost tip 212 to the innermost end 222. For example and without limitation, FIG. 4 shows one specific embodiment including a bore 230 that includes a cylindrical bore portion 230*a* disposed towards the outermost tip 212, and a curved bore portion 230*b* disposed towards the innermost end 222. In this specific embodiment, the curved bore portion 230*b* has a relatively smaller bore $b_o$ at its medial end 232 and a relatively larger bore $b_i$ at its innermost end 222. In the embodiment specifically shown in FIG. 5, the bore 230 includes a curved surface 225 along its entire length from the outermost tip 212 to the innermost end 222. The curve of the inner surface 225 of the bore 230 may be defined by any curve equation, such as radial, sinusoidal, parabolic, etc. In some embodiments, the inner surface 225 or a portion thereof is parabolic.

In some embodiments, the bore 230 or a portion thereof includes a frustoconical shape. Generally, the frustoconical bore or portion thereof is oriented such that it includes a relatively smaller bore $b_o$ disposed towards the outermost tip 212 and a relatively larger bore $b_i$ disposed towards the innermost end 222. For example and without limitation, the embodiments specifically shown in FIGS. 3 and 6 each include a frustoconical bore or bore portion. In the embodiment specifically illustrated in FIG. 3, the bore 230 includes a cylindrical bore portion 230*a* disposed towards the outermost tip 212, and a frustoconical bore portion 230*b* disposed towards the innermost end 222. In the embodiment specifically shown in FIG. 6, the bore 230 includes an inner surface 225 that is frustoconical in shape along the entire length L of the bore 230, with a relatively smaller bore $b_o$ disposed at the outermost tip 212 and a relatively larger bore $b_i$ disposed at the innermost end 222.

In some embodiments, the bore 230 or a portion thereof includes a plurality of discrete bore diameters $b_o$, $b_i$, $b_{i2}$, $b_{i3}$, $b_{i4}$, etc. Each successive bore diameter, viewed from outermost tip 212 to innermost end 222, may be slightly larger than the previous bore diameter such that the inner surface 225 of the bore 230 appears stepped. Each bore diameter $b_o$, $b_i$, $b_{i2}$, $b_{i3}$, $b_{i4}$, etc. may be independently selected from the group consisting of: 0.60 mm, 0.61 mm, 0.62 mm, 0.63 mm, 0.64 mm, 0.65 mm, 0.66 mm, 0.67 mm, 0.68 mm, 0.69 mm, 0.70 mm, 0.71 mm, 0.72 mm, 0.73 mm, 0.74 mm, 0.75 mm, 0.76 mm, 0.77 mm, 0.78 mm, 0.79 mm, 0.80 mm, 0.81 mm, 0.82 mm, 0.83 mm, 0.84 mm, 0.85 mm, 0.86 mm, 0.87 mm, 0.88 mm, 0.89 mm, 0.90 mm, 0.91 mm, 0.92 mm, 0.93 mm, 0.94 mm, 0.95 mm, 0.96 mm, 0.97 mm, 0.98 mm, 0.99 mm, 1.00 mm, 1.01 mm, 1.02 mm, 1.03 mm, 1.04 mm, 1.05 mm, 1.06 mm, 1.07 mm, 1.08 mm, 1.09 mm, 1.10 mm, 1.11 mm, 1.12 mm, 1.13 mm, 1.14 mm, 1.15 mm, 1.16 mm, 1.17 mm, 1.18 mm, 1.19 mm, 1.20 mm, 1.21 mm, 1.22 mm, 1.23 mm, 1.24 mm, 1.25 mm, 1.26 mm, 1.27 mm, 1.28 mm, 1.29 mm, 1.30 mm, 1.31 mm, 1.32 mm, 1.33 mm, 1.34 mm, 1.35 mm, 1.36 mm, 1.37 mm, 1.38 mm, 1.39 mm, 1.40 mm, 1.41 mm, 1.42 mm, 1.43 mm, 1.44 mm, 1.45 mm, 1.46 mm, 1.47 mm, 1.48 mm, 1.49 mm, 1.50 mm, 1.51 mm, 1.52 mm, 1.53 mm, 1.54 mm, 1.55 mm, 1.56 mm, 1.57 mm, 1.58 mm, 1.59 mm, 1.60 mm, 1.61 mm, 1.62 mm, 1.63 mm, 1.64 mm, 1.65 mm, 1.66 mm, 1.67 mm, 1.68 mm, 1.69 mm, 1.70 mm, 1.71 mm, 1.72 mm, 1.73 mm, 1.74 mm, 1.75 mm, 1.76 mm, 1.77 mm, 1.78 mm, 1.79 mm, 1.80 mm, 1.81 mm, 1.82 mm, 1.83 mm, 1.84 mm, 1.85 mm, 1.86 mm, 1.87 mm, 1.88 mm, 1.89 mm, 1.90 mm, 1.91 mm, 1.92 mm, 1.93 mm, 1.94 mm, 1.95 mm, 1.96 mm, 1.97 mm, 1.98 mm, 1.99 mm, 2.00 mm, 2.01 mm, 2.02 mm, 2.03 mm, 2.04 mm, 2.05 mm, 2.06 mm, 2.07 mm, 2.08 mm, 2.09 mm, 2.10 mm, 2.11 mm, 2.12 mm, 2.13 mm, 2.14 mm, 2.15 mm, 2.16 mm, 2.17 mm, 2.18 mm, 2.19 mm, 2.20 mm, 2.21 mm, 2.22 mm, 2.23 mm, 2.24 mm, 2.25 mm, 2.26 mm, 2.27 mm, 2.28 mm, 2.29 mm, 2.30 mm, 2.31 mm, 2.32 mm, 2.33 mm, 2.34 mm, 2.35 mm, 2.36 mm, 2.37 mm, 2.38 mm, 2.39 mm, 2.40 mm, 2.41 mm, 2.42 mm, 2.43 mm, 2.44 mm, 2.45 mm, 2.46 mm, 2.47 mm, 2.48 mm, 2.49 mm, or 2.50 mm.

The vent nib 200 is disposed between the C vent CV and the A vent AV of the bassoon's wing joint 20. The exact location of the vent nib 200 may vary slightly from bassoon to bassoon, but generally is located about 2.5-3.5 cm below the C vent CV, and about 2.5-3.5 cm above the A vent AV. In one non-limiting example, the centerline $\mathbf{25}_{CL}$ of the vent nib 200 is located 2.5-3.5 cm, or about 2.75-3.0 cm, below the centerline $CV_{CL}$ of the C vent CV, and about 2.5-3.5 cm, or about 2.75-3.25 cm, above the centerline $AV_{CL}$ of the A vent AV.

The improved octave key systems 100 of the present disclosure may be installed as original components on a bassoon. In other embodiments, the improved octave key systems 100 of the present disclosure may be installed on an already-manufactured bassoon. To install an improved octave system 100, a hole 25 sized approximately the same diameter as the minor diameter $d_i$ of the internal component 220 of the vent nib 200 is made through the side wall 20*w* of the wing joint. The hole 25 is made approximately 2.5-3.5 cm below the C vent CV, for example 2.5 cm, 2.55 cm, 2.6 cm, 2.65 cm, 2.7 cm, 2.75 cm, 2.8 cm, 2.85 cm, 2.9 cm, 2.95 cm, 3 cm, 3.05 cm, 3.1 cm, 3.15 cm, 3.2 cm, 3.25 cm, 3.3 cm, 3.35 cm, 3.4 cm, 3.45 cm, or 3.5 cm below the C vent CV. In some embodiments, the hole 25 is disposed approximately 2.5-3.5 cm above the A vent AV, for example 2.5 cm, 2.55 cm, 2.6 cm, 2.65 cm, 2.7 cm, 2.75 cm, 2.8 cm, 2.85 cm, 2.9 cm, 2.95 cm, 3 cm, 3.05 cm, 3.1 cm, 3.15 cm, 3.2 cm, 3.25 cm, 3.3 cm, 3.35 cm, 3.4 cm, 3.45 cm, or 3.5 cm above the A vent AV. The position of the hole 25 may be determined by measuring, for example, from the centerline $CV_{CL}$ of the C vent CV, and/or from the centerline $AV_{CL}$ of the A vent AV. A vent nib 200 is then inserted into the hole 25. An adhesive may optionally be used to secure the vent nib 200 in the hole 25.

A sealing pad 112 is attached to a rod 17 in operative communication with the thumb key 12*a*, for example the same rod 17 that also includes the whisper key 18 for mating with the bocal nub 18*a*. A bridge 14 may be disposed between the rod 17 and the sealing pad 112 if necessary. Installation is complete when actuation of the thumb key 12*a* causes the sealing pad 112 to engage with the outer surface 215 of the vent nib 200, and when release of the thumb key 12*a* causes the sealing pad 112 to disengage from the surface 215 of the vent nib 200.

In some embodiments, the present disclosure provides an improved octave system for a bassoon instrument, the improved octave system comprising: a vent nib 200 disposed through a side wall 20*w* of a wing joint component 20 of the musical instrument; and a thumb-actuated octave key 100 comprising: a thumb key 12*a*, and a whisper key pad 18 and a sealing pad 112 each operatively connected to the thumb pad 12*a* by one or more rods and bridges 14-17, wherein the whisper key pad 18 is disposed to seal a bocal nub vent 18*a* disposed on a bocal B when the thumb key 12*a* is actuated, and wherein the sealing pad 112 is disposed to seal the vent nib 200 when the thumb key 12*a* is actuated. In some embodiments, the whisper key pad 18 and the sealing pad 112 are each disposed on a single rod 17 in operative communication with the thumb key 12*a*. In some embodiments, the sealing pad 112 is disposed a predetermined distance 25-CV below a C vent CV of the bassoon. In some embodiments, the improved octave system further comprises a bridge 15 in operative communication between the single rod 17 and the thumb key 12*a*. In some embodiments, the improved octave system further comprises a second rod 14 disposed in operative communication between the bridge 15 and the thumb key 12*a*. In some embodiments, the vent nib 200 includes a rounded outer contour 215 configured to engage the sealing pad 112. In some embodiments, the vent nib 200 includes a bore 230 having a first cylindrical bore 230*a* and a second tapered bore 230*b*. In some embodiments, the first cylindrical bore 230*a* has a bore diameter $b_o$ of about 0.65 mm to about 0.85 mm. In some embodiments, the second tapered bore 230*b* has a first bore diameter $b_o$ of about 0.65 mm to about 0.85 mm at a central end 232, and a second bore diameter $b_i$ of about 1.85 to about 2.0 mm at an internal end 222. In some embodiments, the bore 230 has a generally smooth curved contour 225 from its external end 212 to its internal end 222. In some embodiments, the bore 230 has a generally parabolic curved contour 225. In some embodiments, the first cylindrical bore 230*a* has a length $L_e$ of about 1.5 mm to about 2.5 mm. In some embodiments, the second tapered bore 230*b* has a length Li of about 6.5 mm to about 8.5 mm. In some embodiments, the vent nib 200 has a maximum external diameter $d_o$ of about 3 mm to about 4 mm. In some embodiments, the vent nib 200 has a maximum internal diameter $d_i$ of about 2.8 mm to about 3.8 mm. In some embodiments, the bassoon instrument is a bassoon pitched in the key of C and having a standard playing range of Bb1 to F5. In some embodiments, the bassoon instrument is a contrabassoon pitched in the key of C and having a standard playing range of Bb0 or A0 to D4.

In some embodiments, the present disclosure provides a bassoon comprising an octave key system, the octave key system comprising: a vent nib 200 disposed through a side wall 20*w* of a wing joint component 20 of the musical instrument; and a thumb-actuated octave key 100 comprising: a thumb key 12*a*, and a whisper key pad 18 and a sealing pad 112 each operatively connected to the thumb pad 12*a* by one or more rods and bridges 14-17, wherein the whisper key pad 18 is disposed to seal a bocal nub vent 18*a* disposed on a bocal B when the thumb key 12*a* is actuated, and wherein the sealing pad 112 is disposed to seal the vent nib 200 when the thumb key 12*a* is actuated. In some embodiments, the whisper key pad 18 and the sealing pad 112 are each disposed on a single rod 17 in operative communication with the thumb key 12*a*. In some embodiments, the sealing pad 112 is disposed a predetermined distance 25-CV below a C vent CV of the bassoon. In some embodiments, the bassoon further comprises a bridge 15 in operative communication between the single rod 17 and the thumb key 12*a*. In some embodiments, the bassoon further comprised a second rod 14 disposed in operative communication between the bridge 15 and the thumb key 12*a*. In some embodiments, the vent nib 200 includes a rounded outer contour 215 configured to engage the sealing pad 112. In some embodiments, the vent nib 200 includes a bore 230 having a first cylindrical bore 230*a* and a second tapered bore 230*b*. In some embodiments, the first cylindrical bore 230*a* has a bore diameter $b_o$ of about 0.65 mm to about 0.85 mm. In some embodiments, the second tapered bore 230*b* has a first bore diameter $b_o$ of about 0.65 mm to about 0.85 mm at a central end 232, and a second bore diameter $b_i$ of about 1.85 to about 2.0 mm at an internal end 222. In some embodiments, the bore 230 has a generally smooth curved contour 225 from its external end 212 to its internal end 222. In some embodiments, the bore 230 has a generally parabolic curved contour 225. In some embodiments, the first cylindrical bore 230*a* has a length $L_e$ of about 1.5 mm to about 2.5 mm. In some embodiments, the second tapered bore 230*b* has a length Li of about 6.5 mm to about 8.5 mm. In some embodiments, the vent nib 200 has a maximum external diameter $d_o$ of about 3 mm to about 4 mm. In some embodiments, the vent nib 200 has a maximum internal diameter $d_i$ of about 2.8 mm to about 3.8 mm. In some embodiments, the bassoon is a bassoon pitched in the key of C and having a standard playing range of Bb1 to F5. In some embodiments, the bassoon is a contrabassoon pitched in the key of C and having a standard playing range of Bb0 or A0 to D4.

EXAMPLES

Example 1

A vent nib 200 consistent with FIGS. 5 and 12 of the present disclosure was produced from a brass alloy material and featured the following parameters:

| Parameter | Dimension |
|---|---|
| $b_o$ | 0.660-0.889 mm |
| $b_i$ | 2.08 mm |
| $L_e$ | 2 mm |
| $L_i$ | 7.5 mm |
| $d_o$ | 3.4 mm |
| $d_i$ | 3.2 mm |

The vent nib 200 was installed in the side wall 20*w* of a wing joint 20 of a Heckel bassoon serial number 5831 (c. 1923) bassoon 2.75 cm below the C vent CV (i.e., 25-CV=2.75 mm) and 3 cm above the A vent AV (i.e., 25-AV=3 cm). A sealing pad 112 was installed on a rod 17 that had previously included a whisper key 18 to form an improved octave key system 100.

Figure 13:
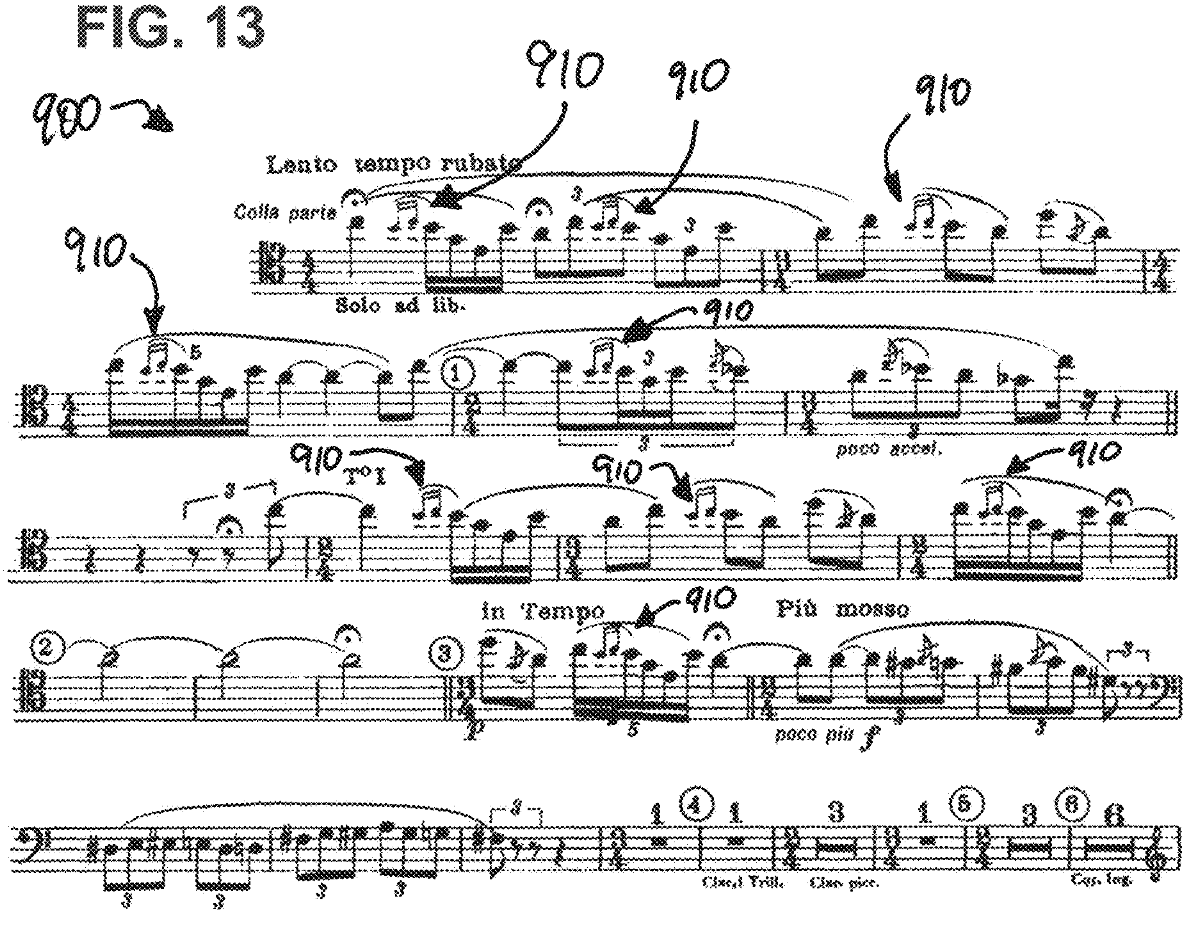
FIG. 13 shows an example of a musical passage intended for performance on a bassoon made much easier when performed on a bassoon instrument including an improved octave key system consistent with the present disclosure.

The solo passage 900 shown in FIG. 13 was performed on the bassoon including the improved octave key system 100. The solo passage 900, and especially the mordents 910, was substantially easier to play using the improved octave key system 100 including the vent nib 200 described above. Without wishing to be bound by theory, it is currently believed that the improved ease of playing solo passage 900 is partially provided by elimination of the need for the player's left thumb to perform multiple discrete motions for each note specified in the mordents 910.

Example 2

A vent nib 200 consistent with FIGS. 5 and 12 of the present disclosure was produced from a brass alloy material and featured the following parameters:

| Parameter | Dimension |
|---|---|
| $b_o$ | 0.660-0.889 mm |
| $b_i$ | 2.08 mm |
| $L_e$ | 2 mm |
| $L_i$ | 7.5 mm |
| $d_o$ | 3.4 mm |
| $d_i$ | 3.2 mm |

The vent nib 200 was installed in the side wall 20*w* of a wing joint 20 of a Fox Model 601 bassoon having manufacturer's serial number 47052 such that the vent nib 200 was located 2.75 cm below the C vent CV (i.e., 25-CV=2.75 mm) and 3 cm above the A vent AV (i.e., 25-AV=3 cm). A sealing pad 112 was installed on a rod 17 that had previously included a whisper key 18 to form an improved octave key system 100.

The solo passage 900 shown in FIG. 13 was performed on the bassoon including the improved octave key system 100. The solo passage 900, and especially the mordents 910, was substantially easier to play using the improved octave key system 100 including the vent nib 200 described above. Without wishing to be bound by theory, it is currently believed that the improved ease of playing solo passage 900 is partially provided by elimination of the need for the player's left thumb to perform multiple discrete motions for each note specified in the mordents 910.

Example 3

A vent nib 200 consistent with FIGS. 5 and 12 of the present disclosure was produced from a brass alloy material and featured the following parameters:

| Parameter | Dimension |
|---|---|
| $b_o$ | 0.660-0.889 mm |
| $b_i$ | 2.08 mm |
| $L_e$ | 2 mm |
| $L_i$ | 7.5 mm |
| $d_o$ | 3.4 mm |
| $d_i$ | 3.2 mm |

The vent nib 200 was installed in the side wall 20*w* of a wing joint 20 of a Jordan Weisberg Systems Saint Louis model bassoon having manufacturer's serial number 010120 such that the vent nib 200 was located 2.75 cm below the C vent CV (i.e., 25-CV=2.75 mm) and 3 cm above the A vent AV (i.e., 25-AV=3 cm). A sealing pad 112 was installed on a rod 17 that had previously included a whisper key 18 to form an improved octave key system 100.

The solo passage 900 shown in FIG. 13 was performed on the bassoon including the improved octave key system 100. The solo passage 900, and especially the mordents 910, was substantially easier to play using the improved octave key system 100 including the vent nib 200 described above. Without wishing to be bound by theory, it is currently believed that the improved ease of playing solo passage 900 is partially provided by elimination of the need for the player's left thumb to perform multiple discrete motions for each note specified in the mordents 910.

CONCLUSION

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

For purposes of the description hereinafter, the terms "upper, lower, right, left, vertical, horizontal, top, bottom, lateral, longitudinal" and other terms of orientation or position and derivatives thereof, shall relate to the invention as it is depicted in the figures. The term "configured" or "configuration" will be understood as referring to a structural size and/or shape. It is to be understood that the invention may assume alternative variations and step sequences, except where expressly specified to the contrary. It is also to be understood that the specific systems and processes illustrated in the attached drawings, and described in the following specification, are simply exemplary examples of the invention. Hence, specific dimensions and other physical characteristics related to the examples disclosed herein are not to be considered as limiting.

What is claimed is:

1. A vent nib for a woodwind instrument, the vent nib comprising:
- an external portion having a curved outer surface;
- an internal portion configured to mate with a bore disposed through the woodwind instrument; and
- a nib bore extending through the external portion and the internal portion of the vent nib, the nib bore comprising:
  - a cylindrical bore portion disposed in the external portion and having a cylindrical nib bore diameter; and
  - a second bore portion having:
    - a second nib bore diameter that is different than the cylindrical nib bore diameter, and
    - a curved, parabolic, arcuate, or stepped profile.

2. The vent nib of claim 1, wherein the external portion has a larger outside diameter than an outside diameter of the internal portion.

3. The vent nib of claim 1, wherein the nib bore consists of a cylindrical bore.

4. The vent nib of claim 1, wherein the second pore portion has a cylindrical profile.

5. The vent nib of claim 1, wherein the second bore portion has a tapered profile.

6. The vent nib of claim 1, wherein the woodwind instrument is a bassoon.

7. A vent nib for a woodwind instrument, the vent nib comprising:
- an external end;
- an internal end disposed opposite the external end; and
- a bore extending from the external end to the internal end, the bore including:
- a first bore portion at the external end and having a first bore profile, and
- a second bore portion at the internal end and having a second bore profile different from the first bore profile, wherein the second bore profile is curved, parabolic, arcuate, or stepped.

8. The vent nib of claim 7, wherein the first bore profile is cylindrical.

9. The vent nib of claim 7, wherein the second bore profile is cylindrical.

10. The vent nib of claim 7, wherein the second bore profile is tapered.

11. The vent nib of claim 7, wherein the external end includes a curved outer surface.

* * * * *